(12) United States Patent
Rosenholm

(10) Patent No.: US 11,414,952 B1
(45) Date of Patent: Aug. 16, 2022

(54) DISSOLVABLE THREAD-SEALANT FOR DOWNHOLE APPLICATIONS

(71) Applicant: Workover Solutions, Inc., Imperial, PA (US)

(72) Inventor: Carl Andrew Rosenholm, Sugar Land, TX (US)

(73) Assignee: Workover Solutions, Inc., Imperial, PA (US)

( * ) Notice: Subject to any disclaimer, the term of this patent is extended or adjusted under 35 U.S.C. 154(b) by 427 days.

(21) Appl. No.: 16/596,471

(22) Filed: Oct. 8, 2019

Related U.S. Application Data

(60) Provisional application No. 62/744,865, filed on Oct. 12, 2018.

(51) Int. Cl.
| | |
|---|---|
| *E21B 29/02* | (2006.01) |
| *E21B 33/12* | (2006.01) |
| *E21B 33/134* | (2006.01) |
| *C22C 23/02* | (2006.01) |
| *C08L 9/06* | (2006.01) |
| *C08L 77/02* | (2006.01) |
| *C08L 29/04* | (2006.01) |
| *E21B 34/06* | (2006.01) |

(52) U.S. Cl.
CPC ............... *E21B 33/12* (2013.01); *C08L 9/06* (2013.01); *C08L 29/04* (2013.01); *C08L 77/02* (2013.01); *C22C 23/02* (2013.01); *E21B 29/02* (2013.01); *E21B 33/134* (2013.01); *E21B 34/063* (2013.01); *C08L 2203/16* (2013.01)

(58) Field of Classification Search
CPC .............................. E21B 29/02; E21B 34/063
See application file for complete search history.

(56) References Cited

U.S. PATENT DOCUMENTS

| | | | |
|---|---|---|---|
| 3,981,852 A | 9/1976 | Manwiller et al. | |
| 5,922,808 A | 7/1999 | Hanada et al. | |
| 5,969,242 A * | 10/1999 | Hubbell | E21B 47/047 |
| | | | 73/152.55 |
| 6,766,858 B2 | 7/2004 | Nguyen et al. | |
| 7,481,952 B2 | 1/2009 | Ren et al. | |
| 9,109,269 B2 | 8/2015 | Xu | |
| 9,702,029 B2 | 7/2017 | Fripp et al. | |
| 10,144,860 B1 * | 12/2018 | Reddy | C04B 26/28 |
| 10,385,628 B2 * | 8/2019 | Colenutt | E21B 17/1085 |
| 2005/0205264 A1 | 9/2005 | Starr et al. | |

(Continued)

OTHER PUBLICATIONS

Product Information Sheet titled "15-S Series Skived PTFE Film w/ Silicone Adhesive," CS Hyde Company, created on Sep. 15, 2011, retrieved on Jul. 30, 2015, 1 page.

(Continued)

*Primary Examiner* — Catherine Loikith
(74) *Attorney, Agent, or Firm* — Jones Walker LLP

(57) ABSTRACT

Dissolvable thread sealants are useful for forming a pressure-tight seal between dissolvable threaded components, particularly in downhole tools. A film of the dissolvable thread sealant can be formed on the threads of dissolvable threaded components. As the dissolvable threaded components are exposed to fluid under the appropriate conditions and begin to dissolve, the thread sealant becomes exposed to the fluid and, likewise, dissolves. Embodiments of the dissolvable thread sealants are made using polyvinyl alcohol (PVA).

22 Claims, 2 Drawing Sheets

(56) References Cited

U.S. PATENT DOCUMENTS

2015/0021026 A1* 1/2015 Giroux .................. E21B 33/146
                                                    166/177.4
2018/0328140 A1* 11/2018 Schmidt ................ E21B 21/103
2020/0095840 A1* 3/2020 Gill ......................... E21B 33/12

OTHER PUBLICATIONS

Technical Data Sheet titled "3M Water-Soluble Wave Solder Tape 5414, Transparent," 3M Company, Apr. 2017, 3 pages.

* cited by examiner

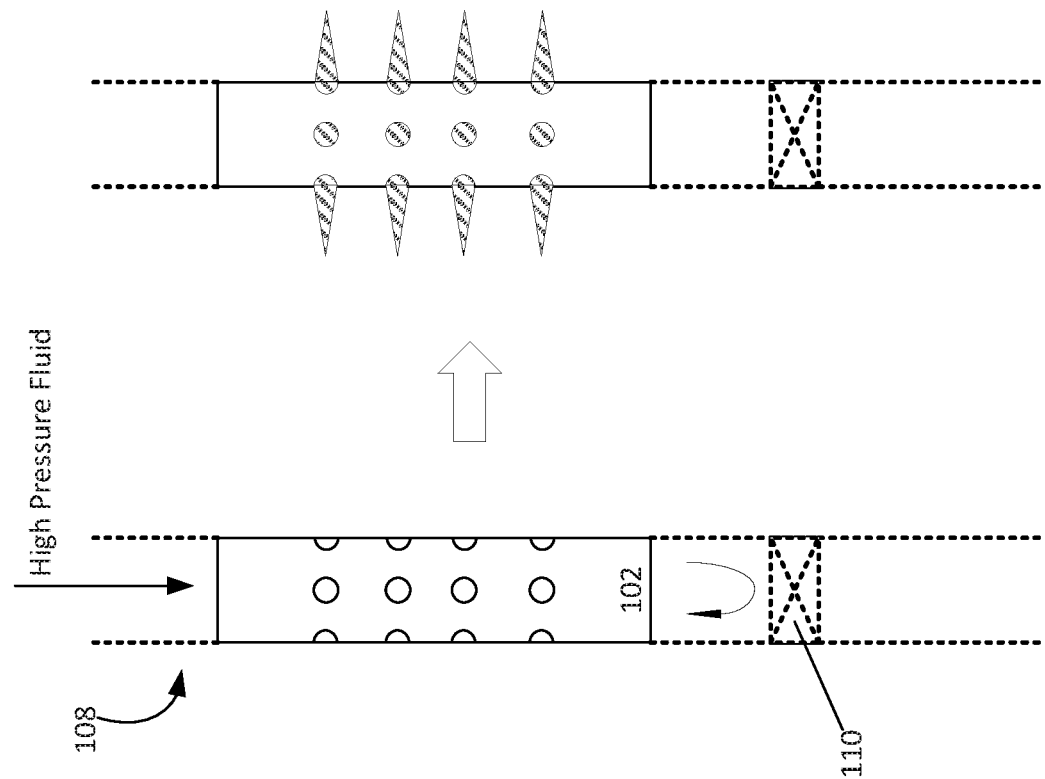
Figure 1D
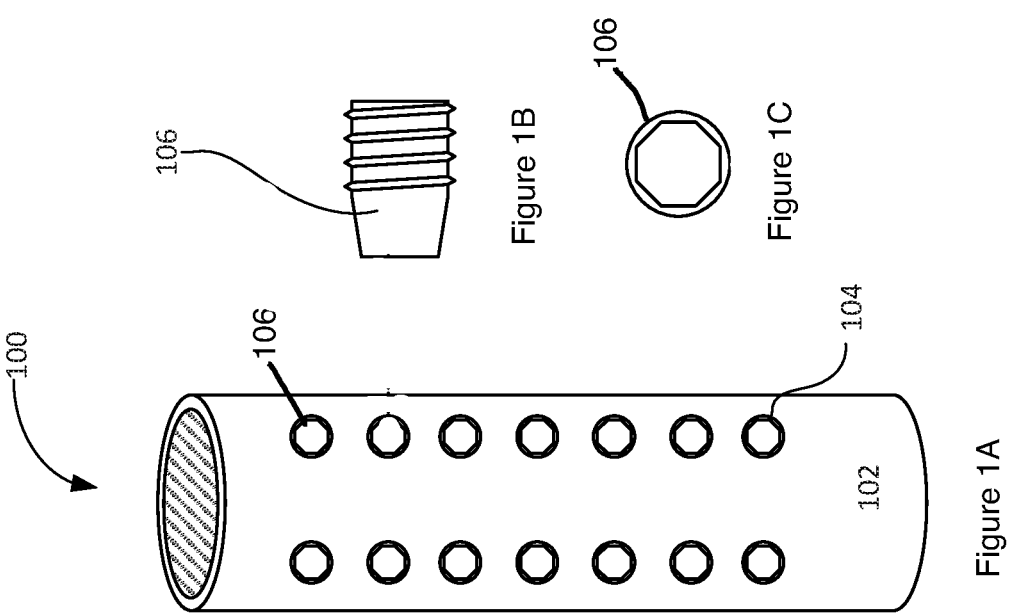
Figure 1B
Figure 1C
Figure 1A

DISSOLVABLE THREAD-SEALANT FOR DOWNHOLE APPLICATIONS

CROSS-REFERENCE TO RELATED APPLICATIONS

This is a non-provisional of U.S. Provisional Patent Application Ser. No. 62/744,865, filed Oct. 12, 2018, which is incorporated herein by reference in its entirety, and to which priority is claimed.

FIELD OF THE INVENTION

This application relates to the field of degradable downhole tools and equipment. More particularly, the application relates to a dissolvable thread sealant for use with degradable tools and equipment.

BACKGROUND

A wide variety of downhole tools may be used within a wellbore in connection with producing hydrocarbons or reworking a well that extends into a hydrocarbon formation. Downhole tools such as frac plugs, bridge plugs, and packers, for example, may be used to seal a component against casing along the wellbore wall or to isolate one pressure zone of the formation from another. Such downhole tools are well known in the art.

After the production or reworking operation is complete, these downhole tools must be removed from the wellbore. Tool removal has conventionally been accomplished by complex retrieval operations, or by milling or drilling the tool out of the wellbore mechanically. Thus, downhole tools are either retrievable or disposable. Disposable downhole tools have traditionally been formed of drillable metal materials such as cast iron, brass and aluminum. To reduce the milling or drilling time, the next generation of downhole tools comprises dissolvable materials such as composites and other materials, such as engineering grade plastics and dissolvable metal-containing materials. Nevertheless, often non-dissolvable scraps remain in the wellbore even after exposing dissolvable tools and components to appropriate dissolving conditions. Thus, there is a need to facilitate the dissolving and removal of dissolvable tools and components.

SUMMARY

Disclosed herein is a method of forming a seal between two threaded components, the method comprising: applying a polymer film to threads of at least one of the components, and threading the components together to form a seal between the components, wherein at least one of the components comprises a first dissolvable material, and wherein the polymer film comprises a second dissolvable material that is the same or different than the first dissolvable material. According to some embodiments, the first dissolvable material comprises one or more materials selected from the group consisting of magnesium, magnesium-based alloys, and dissolvable polymer. According to some embodiments, the second dissolvable material comprises a dissolvable polymer. According to some embodiments, the polymer is polyvinyl alcohol (PVA). According to some embodiments, the second material further comprises a polycaprolactam. According to some embodiments, the second material further comprises a styrene-rubber polymer additive. According to some embodiments, the second material further comprises a swelling agent. According to some embodiments, applying a polymer film to threads of at least one of the components comprises wrapping the threads in a tape comprising the second dissolvable material. According to some embodiments, the tape comprises PVA. According to some embodiments, the tape has a thickness of about 0.001 to about 0.050 inches. According to some embodiments, the tape does not comprise an adhesive layer. According to some embodiments, the seal is capable of withstanding fluid pressures of up to 10,000 psig without leaking. According to some embodiments, the second material is capable of being dissolved under conditions sufficient to dissolve the first material.

Also disclosed herein is a method comprising: (1) assembling a downhole tool, wherein the downhole tool comprises at least a first threaded component and a second threaded component, wherein at least one of the first and second threaded components comprises a first dissolvable material, and wherein assembling the downhole tool comprises applying a polymer film to threads of at least one of the first and second threaded components, and threading the threaded components together to form a seal between the threaded components, wherein the polymer film comprises a second dissolvable material; (2) introducing the downhole tool into a wellbore; (3) dissolving a portion of at least one of the first and second threaded components by contacting the first and second threaded components with a fluid capable of dissolving the first dissolvable material, whereby the polymer film is exposed to the fluid; and (4) dissolving the polymer film. According to some embodiments, the second dissolvable material comprises polyvinyl alcohol (PVA). According to some embodiments, applying the polymer film to the threads of at least one of the first and second threaded components comprises wrapping the threads with a tape comprising PVA.

Also disclosed herein is a downhole tool comprising: a first threaded component threaded to a second threaded component, wherein at least one of the first and second threaded components comprise a first dissolvable material, and a thread-sealing film disposed between the first and second threaded components, wherein the thread-sealing film comprises a second dissolvable material. According to some embodiments, the second dissolvable material comprises polyvinyl alcohol (PVA). According to some embodiments, the thread-sealing film comprises a tape. According to some embodiments, the second material is capable of being dissolved under conditions sufficient to dissolve the first material.

BRIEF DESCRIPTION OF THE DRAWINGS

FIG. 1A shows an example of a downhole tool having dissolvable threaded components.

FIG. 1B is a side view of an example of a dissolvable threaded component.

FIG. 1C is a front view of the example of the dissolvable threaded component shown in FIG. 1B.

FIG. 1D shows deployment and use of a downhole tool having dissolvable threaded components.

DESCRIPTION

Figure 2:
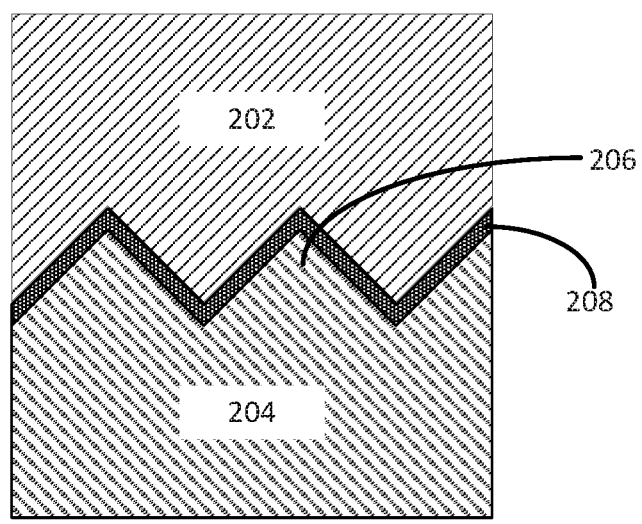
FIG. 2 shows a film of a dissolvable thread sealant disposed between threaded components.

As mentioned above, dissolvable tools and components are increasingly being used in wellbore operations. Such tools having threads, i.e., dissolvable threaded components, are particularly relevant to this disclosure. As used herein, the term "dissolvable threaded component" refers to a component used for downhole operations, wherein the component includes threads and is dissolvable (or degradable) under certain downhole conditions. The conditions for degradation are generally wellbore conditions in a wellbore environment where an external stimulus may be used to initiate or affect the rate of degradation. For example, a fluid comprising an electrolyte may be introduced into a wellbore to initiate degradation. In another example, the wellbore may naturally produce an electrolyte sufficient to initiate degradation. The term "wellbore environment" refers to a subterranean location within a wellbore and includes both naturally occurring wellbore environments and materials or fluids introduced into the wellbore environment. As another example, the dissolvable component may dissolve or degrade when exposed to an aqueous fluid having a high temperature. In other words, the degradation rate of the dissolvable threaded component(s) may be accelerated based on conditions in the wellbore or conditions of the wellbore fluids (either natural or introduced) including temperature, pH salinity, pressure, and the like.

Examples of dissolvable threaded components used in wellbore operations include, for example, fracturing plugs, toe valves, casing perforations plugs, etc. FIG. 1A illustrates an example of a wellbore tool 100 having dissolvable components. The illustrated tool includes a tubular member 102, which may be a casing for a wellbore, for example. The tubular member 102 includes a plurality of perforations 104 through the wall of the tubular member 102. The perforations 104 are adapted to contain dissolvable threaded plugs 106 as shown in FIGS. 1A-1C. For example, the wall of the tubular member 102 may be tapped to accept the dissolvable threaded plugs 106. The dissolvable threaded plugs 106 may be made of a dissolvable material such as magnesium or magnesium-based alloys, for example. Examples of magnesium-based alloys include alloys comprising magnesium alloyed with one or more other metals such as zinc, zirconium, aluminum, manganese, tungsten, nickel, iron and/or copper. Dissolvable components may be formed of dissolvable aluminum or dissolvable aluminum-based alloys. Dissolvable components may alternatively be formed from dissolvable polymer materials.

FIG. 1D shows the operation of the tool 100. The tubular member 102 is incorporated into a well tubular 108, which is disposed in a wellbore. In the illustrated embodiment, the well tubular 108 includes a plug 110, which isolates the portion of the wellbore above the plug from the portion of the wellbore below the plug. High pressure fluid is provided within the tubular 108. The high-pressure fluid having an appropriate temperature, pressure, and composition can dissolve the dissolvable threaded plugs 106 and fracture the formation.

With the advent of such dissolvable threaded components comes the need to create a pressure-tight leak-free seal between such components. Pressures downhole can be generally as high as 10,000 psig. Fluid at such pressures can leak past untreated threaded components, which is undesirable. Thus, in many downhole situations it is necessary to treat the dissolvable threaded components to prevent such leakage. However, types of thread treatments known in the art, such as PTFE tape, for example, are unsatisfactory for applications involving dissolvable threaded components because once the components dissolve, rings of the PTFE are left behind. Such left behind materials can clog or foul downhole equipment, such as screens and pumps. Thread sealing pastes have been found to be incapable of withstanding pressures encountered in downhole environments.

The inventor has determined that a pressure-tight leak-free seal between dissolvable threaded components may be maintained at high wellbore pressures if the threads of the dissolvable threaded components are treated with a film of a dissolvable polymer. FIG. 2 shows an enlarged view of a threaded junction between a first threaded member 202 and second threaded member 204. The threads may be standard or NPT thread, for example. One or both of threaded members may comprise a dissolvable material. For example, the first threaded member 202 may be the wall of the tubular member 102 illustrated in FIG. 1A (not dissolvable) and the second threaded member 204 may be the dissolvable threaded plug 106 of FIGS. 1A-1C. In the embodiment illustrated in FIG. 2, the threads 206 of the second threaded member 204 are treated with a dissolvable polymer thread-treating film 208. The dissolvable polymer thread-treating film 208 is deformable under pressure as the threaded members 202 and 204 are threaded together. Thus, the dissolvable polymer thread-treating film 208 expands to fill any gaps between the members, which would allow fluids to leak. The dissolvable polymer thread-treating film is dissolvable under conditions sufficient for dissolving the dissolvable threaded component(s).

According to some embodiments, the dissolvable polymer thread-treating film comprises polyvinyl alcohol (PVA). PVA is a water-soluble polymer having an ideal formula of $[CH_2CH(OH)]_n$. PVA's repeat unit includes a hydroxyl functional group having a random stereochemistry along the polymer chain (i.e., PVA is atactic). PVA is generally produced by a two-step process: 1) the polymerization of vinyl acetate to form polyvinyl acetate and 2) the hydrolysis of the acetate groups in the polyvinyl acetate to form PVA. The properties of PVA are highly dependent on its molecular weight and the degree of hydrolysis (i.e., the percentage of acetate groups that are hydrolyzed). The molecular weight of PVA is controlled by controlling the vinyl acetate polymerization reaction and the degree of hydrolysis is controlled by controlling the extent of the hydrolysis reaction. As molecular weight and/or the degree of hydrolysis increases, PVA exhibits increased viscosity, increased tensile strength, and increased water and solvent resistance. As molecular weight and/or the degree of hydrolysis decreases, PVA exhibits decreased viscosity, increased flexibility, and increased solubility. PVA can be categorized based upon its degree of hydrolysis as fully hydrolyzed (e.g., >97 mol %), medium hydrolyzed (e.g., 95 to 97 mol %), and partially hydrolyzed (e.g., 85 to 95 mol %). Other polymers that can be used to form the dissolvable thread-treating film include polyglycolic acid (PGA), polylactic acid (PLA), polyhydroxyalkanoates (PHA), combinations of methylcellulose, starch, and PVA, cellulosic polymers (such as buturates, acetates, and propionates), urethanes, poly(ethylene glycol) (PEG), polyvinyl pyrrolidone (PVP), and combinations thereof.

The inventor has specifically observed beneficial properties of the following raw PVA compounds for uses in different applications in downhole operations, including use as a dissolvable polymer thread-treating film: Kuraray Mowiflex C 17 (formerly Mowiflex TC 253), Kuraray Mowiflex C 30 (formerly Mowiflex TC 232), and Kuraray Mowiflex H 15 (each available from Kuraray America, Inc. Houston, Tex.). The Mowiflex C 17 PVA compound contains greater than 96 wt % PVA and has a glass transition temperature of 62° C., a density of 0.6 to 0.9 $g/cm^3$, and a melt flow index of 14-20 g/10 min at 190° C. and a load of 21.6 kg. The Mowiflex C 30 PVA compound contains approximately 75 wt % PVA, 20 wt % aliphatic polyols (plasticizer), and 5 wt % calcium stearate (lubricant) and has a glass transition temperature of 35° C., a density of 0.6 to 0.9 g/cm$^3$, and a melt flow index of 20-40 g/10 min at 190° C. and a load of 21.6 kg. The Mowiflex H 15 PVA compound has a melt flow index of approximately 15 g/10 min at 230° C. and a load of 2.16 kg. The melt flow index values of these raw PVA compounds may be determined in accordance with the ASTM D1238 and/or ISO 1133 test procedures. While these specific grades of PVA compounds are described for purposes of illustration, it will be understood that other types and grades of raw PVA compounds are also suitable. As used herein, the term raw PVA compound refers to an initial material that contains an appreciable quantity of PVA (such as those described above), which is typically supplied by a PVA manufacturer in powder or pelletized form and which can be shaped into a final product or further processed before final shaping. It will be appreciated from the above examples that raw PVA compounds may include materials other than PVA and may include PVA of varying molecular weights and degrees of hydrolysis. Raw PVA compounds can be processed by blending with other polymers and/or adding colorants, fillers, reinforcing materials, or other additional materials to obtain a processed PVA compound having the desired properties. Thus, as used herein, the term processed PVA compound refers to a PVA compound that has been processed to include these various additional materials and may exist as a pellet, a melt, a powder, or a final shaped component. The term PVA compound may refer to either a raw PVA compound or a processed PVA compound.

It has been determined that PVA compounds in which the PVA component has a lower molecular weight and/or a lower degree of hydrolysis (e.g., partially hydrolyzed) or that include a plasticizer (e.g., a polyol plasticizer), such as the Mowiflex C 30 compound, are particularly well-suited for use in manufacturing flexible components, such as a thread-treating film, although other PVA compounds are also suitable. The C 30 compound is both flexible enough that it can be utilized to form components that are used to generate fluid tight seals and strong enough to maintain such fluid tight seals even at the elevated pressures that are observed in downhole operations such as hydraulic fracturing.

It has been determined that various modifications can be made to increase the effectiveness of a thread-treating film that is formed from a PVA compound. These modifications are intended to decrease hardness, prevent premature degradation, and prevent extrusion of the thread-treating film.

A first type of modification seeks to decrease the hardness of the thread-treating film. It has been observed that a thread-treating film that is formed from the Mowiflex C 30 PVA compound alone exhibits a hardness of approximately 97 Shore A, and its hardness decreases only slightly at increased temperatures (e.g., to approximately 94 Shore A at 200° F.).

The hardness of the thread-treating film may be decreased through the addition of a styrene-rubber polymer additive, which is a copolymer that includes polystyrene and rubber. In one embodiment, the styrene-rubber polymer additive may be a block copolymer such as a styrene-ethylene/ butylene-styrene (SEBS) or a styrene-ethylene/propylene-styrene (SEPS) polymer such as those manufactured by Kraton. In one embodiment, Kraton's FG1924 GT polymer, which is a linear triblock copolymer based on styrene and ethylene/butylene with a styrene/rubber ratio of 13/87, is mixed with the Mowiflex C 30 PVA compound in an amount in which the resulting processed PVA compound includes 50 wt % of the styrene-rubber polymer. The resulting processed PVA compound exhibits a hardness at room temperature of approximately 92 Shore A, and the hardness decreases significantly at elevated temperatures (e.g., to approximately 75 Shore A at 200° F.). The addition of the styrene-rubber polymer additive decreases the glass transition temperature (as compared to the material manufactured from the Mowiflex C 30 PVA compound alone) and does not retard the degradation of the material. While the Kraton FG1924 GT polymer has been described, it will be understood that other styrene-rubber polymers might also be employed. In addition, different types of degradation/impact modifiers may be utilized to decrease the hardness and glass transition temperature of a PVA compound. By way of example, materials such as Dupont's Surlyn 9320 or Fusabond N493 may be utilized in similar concentrations to the above-described styrene-rubber polymer to achieve similar results. Dupont's Surlyn 9320 is an ionomer of ethylene acid acrylate terpolymer.

The hardness and density of the thread-treating film may also be decreased through the addition of a chemical foaming agent. In one embodiment, Bergen International's Foamazol 92 chemical foaming agent is added to the processed PVA compound formed from equal parts of the Kraton FG1924 GT styrene-rubber polymer and the Mowiflex C 30 compound in an amount equal to 2 wt % of the processed PVA compound. Upon exposure to increased temperatures (such as those encountered in injection molding or extrusion processes described below), a chemical foaming agent generates a gas. The addition of the chemical foaming agent significantly reduces the hardness and density of the resulting processed PVA compound. While the Bergen Foamazol 92 chemical foaming agent has been described, it will be understood that other chemical foaming agents (including endothermic, exothermic, organic, and inorganic chemical foaming agents) may be employed. As used herein, a chemical foaming agent is a material that facilitates the formation of foam by liberating gas (such as nitrogen, carbon dioxide, etc.) upon exposure to elevated temperatures.

The hardness of the thread-treating film may also be decreased through the addition of further plasticizer (i.e., in addition to any plasticizer that is present in the raw PVA compound). In one embodiment, the Mowiflex C 30 PVA compound is mixed with Poly[4,4'-methylenebis(phenyl isocyanate)-alt-1,4-butanediol/di(propylene glycon/polycaprolactone] plasticizer in an amount in which the resulting processed PVA compound includes 14 wt % of the plasticizer. The resulting processed PVA compound exhibits a hardness at room temperature of approximately 94 Shore A, and the hardness decreases at elevated temperatures (e.g., to approximately 86 Shore A at 200° F.). Although these particular plasticizer materials have been described, it will be understood that other plasticizer materials might also be employed.

To further assist in the creation of a fluid-tight seal, the thread-treating film may be formed from a processed PVA compound having a swelling compound that causes the film to increase in size when it is immersed in water. In one embodiment, the thread-treating film is formed from a processed PVA compound having 1-25 wt % Evonik Creabloc SIS swelling compound. Although a particular swelling compound has been described, it will be understood that other swelling compounds might also be employed.

The premature degradation of the dissolvable thread-treating film may be addressed through the addition of polycaprolactam (PA6 or Nylon-6), which results in the decrease of degradation rates by as much as 80% (as compared to the raw PVA compound) without significantly changing the mechanical properties. In one embodiment, the Mowiflex C 30 PVA compound is mixed with PA6 in an amount in which the resulting processed PVA compound includes 10 wt % PA6. The resulting processed PVA compound exhibits significantly reduced degradation rates. In another embodiment, a processed PVA compound consisting of equal weights of the Mowiflex C 30 PVA compound and the Kraton FG1924 GT polymer is mixed with PA6 in an amount in which the resulting processed PVA compound includes 10 wt % PA6. The resulting processed PVA compound exhibits a significantly reduced degradation rate and a hardness at room temperature of approximately 94 Shore A, which hardness decreases significantly at elevated temperatures (e.g., to approximately 79 Shore A at 200° F.). In one embodiment, the polycaprolactam may be an elastomeric type of polycaprolactam. As used herein, an elastomeric polycaprolactam exhibits greater than 100% strain at break and has a hardness of less than 70 Shore D.

The addition of compounds such as a styrene-rubber polymer (or other degradation/impact modifier), a chemical foaming agent, a plasticizer, a swelling compound, and/or PA6 in desired quantities results in a processed PVA compound with flexibility, hardness, and degradability properties that are well-suited for use as the dissolvable thread-treating film. One or more of the described additives may be mixed with a PVA compound (in any combination of one or more listed additives with a PVA compound) in different ratios to achieve a processed PVA compound having the desired properties of the dissolvable thread-treating film. For example, the dissolvable thread-treating film may be formed from a processed PVA compound that includes between 5 wt % and 70 wt % styrene-rubber polymer, between 20 wt % and 60 wt % styrene-rubber polymer, between 30 wt % and 60 wt % styrene-rubber polymer, between 40 wt % and 60 wt % styrene-rubber polymer, or between 45 wt % and 55 wt % styrene-rubber polymer. A dissolvable thread-treating film with a styrene-rubber polymer additive may have a hardness at 70° F. of between 88 and 96 Shore A, between 90 and 94 Shore A, or between 91 and 92 Shore A. A dissolvable thread-treating film with a styrene-rubber polymer additive may have a hardness at 200° F. of between 70 and 80 Shore A, between 72 and 78 Shore A, or between 74 and 76 Shore A.

The dissolvable thread-treating film may also be formed from a processed PVA compound that includes between 5 wt % and 25 wt % PA6, between 5 wt % and 15 wt % PA6, or between 8 wt % and 12 wt % PA6. The dissolvable thread-treating film may also be formed from a processed PVA compound that includes between 5 wt % and 20 wt % plasticizer (in addition to any plasticizer in the raw PVA compound), between 10 wt % and 15 wt % plasticizer (in addition to any plasticizer in the raw PVA compound), or between 13 wt % and 15 wt % plasticizer (in addition to any plasticizer in the raw PVA compound). The dissolvable thread-treating film may also be formed from a processed PVA compound that includes between 1 wt % and 25 wt % swelling compound, between 5 wt % and 20 wt % swelling compound, or between 10 wt % and 15 wt % swelling compound. The dissolvable thread-treating film may also be formed from a processed PVA compound that includes between 0.5 wt % and 5 wt % chemical foaming agent, between 1 wt % and 3 wt % chemical foaming agent, or between 1.5 wt % and 2.5 wt % chemical foaming agent. Each of the additives (e.g., a styrene-rubber polymer, a chemical foaming agent, a plasticizer, a swelling compound, and/or PA6) may be obtained in a pelletized form (although other forms may also be used), and the additives may be mixed with the PVA compound during or prior to forming the dissolvable thread-treating film.

According to some embodiments, the dissolvable polymer thread-treating film can be applied to the threads of a dissolvable threaded component in the form of a tape in a manner like applying plumber's tape to conventional threads. The tape may or may not include an adhesive material. Generally, preferred embodiments of the dissolvable polymer thread-treating tape do not include an adhesive material. Rather, when the tape is applied to the threads, the tape stretches and conforms to the threads.

The dissolvable polymer thread-treating tape may be provided as a roll. The dissolvable polymer thread-treating tape may have an appropriate width and thickness, depending on the application. For example, the width may be 0.1 to 2 inches (or larger), and typically is about 0.5 inches for most applications. According to some embodiments, the tape may have a thickness of about 0.001 to about 0.05 inches, about 0.01 to 0.01 inches, or about 0.001 to about 0.005 inches. According to some embodiments, it is desirable that the total thickness of the dissolvable polymer thread-treating film applied to the threads of the dissolvable threaded component have total thickness on the order of about 0.002 to about 0.004 inches. When the dissolvable polymer thread-treating film is applied to the threads of a component, the appropriate total thickness is achieved by applying multiple wraps of the tape. For example, a total film thickness of 0.004 inches can be obtained by wrapping the component four times using a tape with a thickness of 0.001 inches.

The dissolvable polymer can be formed into a tape and rolled using any film-forming and rolling techniques known in the art. For example, the polymer films may be prepared using an extrusion process, whereby molten polymer is forced through a die to form the film. The extruded film may be stretched and/or thinned prior to annealing the film and rolling it into a roll. For example, the extruded film may be processed using a blown or tubular process, whereby air is forced into an extruded ring of the polymer to expand the film. Alternatively, the polymer film may be formed using a solution deposition technique, such as evaporative casting.

According to alternative embodiments, the dissolvable polymer thread-treating film may be produced by skiving a film of appropriate thickness from a billet of the dissolvable polymer material. For example, a billet (typically cylindrical) comprising the dissolvable polymer may be produced using an extrusion or injection molding technique. The billet is then rotated, and a blade is used to cut a film of uniform thickness from the billet. The resulting sheet of film can be cut into strips of an appropriate width and strips can be rolled into rolls.

Embodiments of the disclosure provide methods of using downhole tools comprising dissolvable threaded components (one or both components may be dissolvable) in downhole applications by treating the threads with a dissolvable polymer thread-treating film and then threading the components together. According to some embodiments, treating the threads comprises wrapping the threads with a tape comprising the dissolvable polymer thread-treating material, as described above. According to alternative embodiments, treating the thread may comprise other methods of applying the dissolvable polymer thread-treating film to threads. For example, the dissolvable polymer thread-treating film may be applied to the threads as a paste or solution that is dried and/or cured to leave the dissolvable polymer thread-treating film on the threads.

Once the threads of the dissolvable threaded components are treated with the dissolvable polymer thread-treating film, the threaded components are threaded together to form a leak-free pressure-tight bond between the threaded components. The threaded pressure-tight bond may be capable of withstanding fluid pressures of up to 5,000 psig, up to 8,000 psig, or up to 10,000 psig, for example. According to some embodiments, the threaded pressure-tight bond may be capable of withstanding fluid pressures of greater than 10,000 psig.

Once the threaded components are threaded together and the tool is assembled, the tool can be deployed downhole. When the tool is exposed to an appropriate fluid under appropriate conditions, the dissolvable threaded component(s) begin to dissolve. According to preferred embodiments, conditions that are effective for dissolving the dissolvable threaded components are also effective for dissolving the dissolvable polymer thread-treating film. As the dissolvable threaded component(s) dissolve, the dissolvable polymer thread-treating film is exposed to the dissolving fluid, and thus, the dissolvable polymer thread-treating film also dissolves.

It will be appreciated that when tool is deployed in the wellbore, the dissolvable polymer thread-treating film is not substantially exposed to wellbore fluids until the dissolvable threaded component(s) begin to dissolve, thereby exposing the film. Thus, the rate-determining step for dissolving the dissolvable polymer thread-treating film is primarily the dissolution of the dissolvable threaded component(s). Accordingly, the dissolvable polymer thread-treating film may be engineered to dissolve "easier" than the dissolvable threaded component(s). For example, assume that the dissolvable polymer thread-treating film is made of a material that begins to dissolve in fresh water at a temperature of about 70° F. Also assume that the dissolvable threaded component(s) are made of a material that begins to dissolve in fresh water at a temperature of about 150° F. A leak-free pressure-tight seal can be maintained for a substantial length of time under downhole conditions up to about 150° F. in fresh water, because the dissolvable polymer thread-treating film is not substantially exposed to the wellbore fluids under those conditions. Once the temperature exceeds 150° F., the dissolvable threaded component(s) begin to dissolve, thereby exposing the dissolvable polymer thread-treating film to the wellbore fluid. The dissolvable polymer thread-treating film will rapidly dissolve under those conditions.

The foregoing disclosure and the showings made of the drawings are merely illustrative of the principles of this invention and are not to be interpreted in a limiting sense.

What is claimed is:

1. A method of forming a seal between two threaded components, the method comprising:
    a) applying a polymer film to threads of at least one of the two threaded components, and
    b) threading the two threaded components together to form a seal between the two threaded components,
    wherein at least one of the two threaded components comprises a first dissolvable material, and wherein the polymer film comprises a second dissolvable material that is the same or different than the first dissolvable material.

2. The method of claim 1, wherein the first dissolvable material comprises one or more materials selected from the group consisting of magnesium, magnesium-based alloys, aluminum, aluminum-based alloys, and dissolvable polymer.

3. The method of claim 1, wherein the second dissolvable material comprises a dissolvable polymer.

4. The method of claim 3, wherein the dissolvable polymer comprises polyvinyl alcohol (PVA).

5. The method of claim 4, wherein the second dissolvable material further comprises a polycaprolactam.

6. The method of claim 4, wherein the second dissolvable material further comprises a styrene-rubber polymer additive.

7. The method of claim 4, wherein the second dissolvable material further comprises a swelling agent.

8. The method of claim 1, wherein applying a polymer film to threads of at least one of the two threaded components in step (a) comprises wrapping the threads in a tape comprising the second dissolvable material.

9. The method of claim 8, wherein the second dissolvable material comprises polyvinyl alcohol (PVA).

10. The method of claim 8, wherein the tape has a thickness of about 0.001 to about 0.050 inches.

11. The method of claim 8, wherein the tape does not comprise an adhesive layer.

12. The method of claim 1, wherein the seal is capable of withstanding fluid pressures of up to 10,000 psig without leaking.

13. The method of claim 1, wherein the second dissolvable material is dissolvable under conditions sufficient to dissolve the first dissolvable material.

14. A method comprising:
    a) assembling a downhole tool, wherein the downhole tool comprises at least a first threaded component and a second threaded component, wherein at least one of the first and second threaded components comprises a first dissolvable material, and wherein assembling the downhole tool comprises: applying a polymer film to threads of at least one of the first and second threaded components, and threading the threaded components together to form a seal between the threaded components, wherein the polymer film comprises a second dissolvable material;
    b) introducing the downhole tool into a wellbore;
    c) dissolving a portion of at least one of the first and second threaded components by contacting the first and second threaded components with a fluid capable of dissolving the first dissolvable material, whereby the polymer film is exposed to the fluid; and
    d) dissolving the polymer film.

15. The method of claim 14, wherein the second dissolvable material comprises polyvinyl alcohol (PVA).

16. The method of claim 15, wherein the polymer film comprises a tape and the second dissolvable material comprises polyvinyl alcohol (PVA), and wherein applying the polymer film to the threads of at least one of the first and second threaded components in step (a) comprises wrapping the threads with the tape.

17. A downhole tool comprising:
    a first threaded component threaded to a second threaded component, wherein at least one of the first and second threaded components comprise a first dissolvable material, and
    a thread-sealing film disposed between the first and second threaded components, wherein the thread-sealing film comprises a second dissolvable material.

18. The downhole tool of claim 17, wherein the second dissolvable material comprises polyvinyl alcohol (PVA).

19. The downhole tool of claim 18, wherein the thread-sealing film comprises a tape.

20. The downhole tool of claim 17, wherein the second dissolvable material is dissolvable under conditions sufficient to dissolve the first dissolvable material.

21. A method of forming a seal between two joined components, the method comprising:
   a) applying a bonding film to the surface of at least one of the two joined components; and
   b) connecting the two joined components together to form a seal between the two joined components;
   wherein at least one of the two joined components comprises a first dissolvable material, and wherein the bonding film comprises a second dissolvable material that is the same or different than the first dissolvable material.

22. The method of claim 21, wherein the bonding film comprises a dissolvable polymer.

\* \* \* \* \*